Dec. 11, 1928.
N. Y. TROIDL
1,694,405
EDUCATIONAL APPLIANCE
Filed July 22, 1926      2 Sheets-Sheet 1
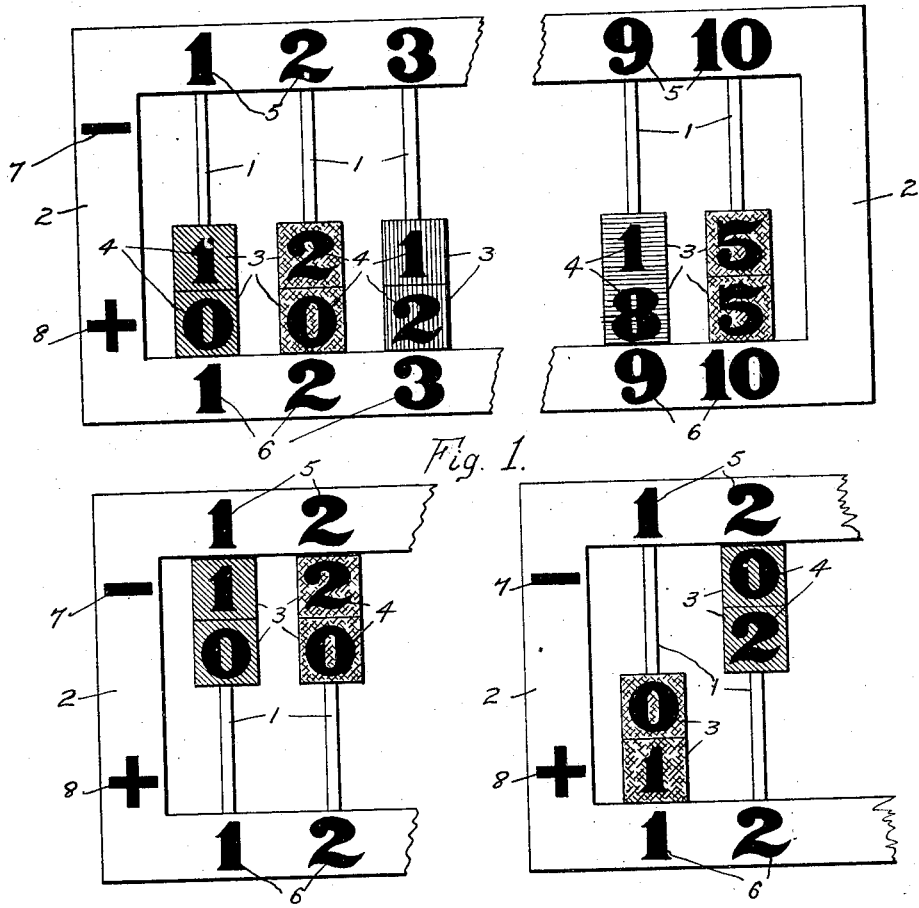
INVENTOR.
Nellie York Troidl
by Parker & Prochnow
ATTORNEYS.

Dec. 11, 1928.

N. Y. TROIDL 1,694,405

EDUCATIONAL APPLIANCE

Filed July 22, 1926    2 Sheets-Sheet 2

INVENTOR.
Nellie York Troidl
by Parker & Prochnow
ATTORNEYS.

Patented Dec. 11, 1928.

1,694,405

UNITED STATES PATENT OFFICE.

NELLIE YORK TROIDL, OF NIAGARA FALLS, NEW YORK.

EDUCATIONAL APPLIANCE.

Application filed July 22, 1926. Serial No. 124,236.

This invention relates to educational appliances or devices of value in the instruction of children. It is known that a child will learn to distinguish objects by certain characteristics, such as color, long prior to learning of the alphabet, spelling or simple mathematical problems, and this invention is particularly directed to devices or appliances with which the child's instinctive association of objects of similar characteristics is utilized in teaching it simple exercises, such as simple spelling, reading, or mathematics.

An object of the invention is to provide an improved educational appliance of this type with which the instruction of children in spelling, reading, arithmetic, and other subjects is facilitated. More particularly, an object is to provide such improved appliances with which the interest of the child in the exercises being solved is more readily maintained; the use of which will be interesting to the child; with which a large number of different exercises may be worked out with a relatively simple and compact device; and which will be relatively inexpensive.

Various other objects and advantages will be apparent from the following description of several embodiments of the invention, and the novel features will be particularly pointed out hereinafter in connection with the appended claims.

In the accompanying drawings:

Fig. 1 is an elevation of an appliance constructed in accordance with this invention, with the objects set to illustrate different problems in addition;

Fig. 2 is a similar elevation of a portion of the appliance, with the objects set to illustrate problems in subtraction;

Fig. 3 is a similar elevation, with the objects set to illustrate problems both in addition and subtraction;

Fig. 4 is an elevation of part of the appliance, with the objects partially turned to show a plurality of faces;

Figure 6:
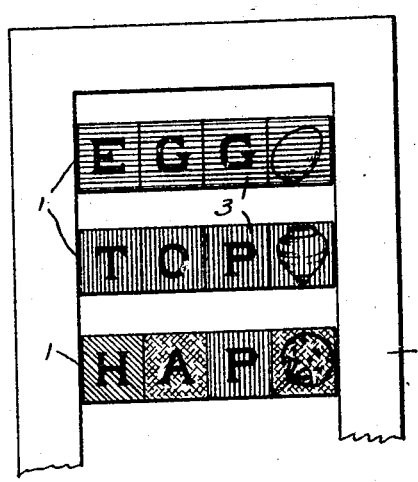
Fig. 6 is an elevation of part of a device, also constructed in accordance with the invention, but illustrating its use in the instruction of spelling.

In the embodiment of the invention illustrated in Figs. 1 to 5, a plurality of wires or rods 1 are mounted in a rectangular frame 2 so as to extend in parallel, but spaced, relation to one another between opposite sides of the frame. A plurality of multifaced objects 3, such as cubes, are independently slidable and rotatable upon each wire or rod 1, such as by having apertures through which the rods 1 pass. The cube is a suitable form for such objects, because it is inexpensive and has relatively large faces.

The faces of the cubes bear distinguishing characteristics by which they may be identified or grouped, and for such distinguishing characteristics I have found different colors to be very satisfactory, because a child very early and easily learns to distinguish and identify colors. Accordingly, in the illustrated embodiment of the invention, the faces of the cubes are given different colors. In Figs. 1 to 6 and 8, each cube has its faces of different color, with the color of each face corresponding to the color upon a face of each of the other cubes upon the same rod, although the colors are not necessarily, and preferably not, arranged in the same order of sequence upon each cube. That is, each face of a cube on any one wire or rod 1 has a color identical with or related to that of a face on each of the other cubes on the same wire or rod, and different colors upon each of its faces. Such difference in colors is shown conventionally on the drawings.

In Figs. 1 to 5 and 8, the cubes also carry upon their faces character representations such as numerals 4, and the numerals are so arranged upon faces of like color on the set of cubes upon each rod or wire that together they indicate part or all of a mathematical problem and its solution. For example, in Figs. 1 to 5, the problems illustrated are in addition and subtraction. The frame, at the ends of the rods 1, may also be provided with numerals 5 and 6 and adjacent its upper and lower parts with a subtraction sign 7 and an addition sign 8, respectively. The wires 1 are longer than the combined lengths of the cubes mounted thereon, so that the cubes may be shifted as a group, either to one end or the other of the wire or rod upon which they are mounted, as shown in the different views.

In Fig. 1 all of the cubes are shown at the bottom of the rods 1, and the plus sign 8 indicates that the cubes are in position to indicate problems in addition. Upon the left hand rod 1 in Fig. 1, the cubes have been individually rotated until their green faces are foremost. The numbers 1 and 0 appearing upon those green faces indicate the particular problem in addition, and the number 6 at the bottom of that rod 1 indicates the answer or sum. Thus, in that example 1 plus 0 equals 1. Similarly, the other cubes on the other wires have been rotated so as to bring their corresponding colors foremost and the numbers on the cubes indicate problems in addition, and the answers or sums of those problems appear at the ends of those wires or rows of numbers on the bottom part of the frame.

In Fig. 2 the cubes have been shifted to the upper or opposite side of the frame adjacent the minus sign, and thus are set for indicating problems in subtraction.

In Fig. 2, the number at the upper end of the rod 1 indicates the sum from which subtraction is to be made, and the numbers upon the faces of the upper cubes indicate the amounts which are to be subtracted from the numbers on the frame. The numbers appearing upon the faces of the lower cubes indicate the result of such subtraction, that is, the answers to those problems. On the left hand rod in Fig. 2, the green faces of the cubes have been brought into view, and the numbers indicate that 1 minus 1 equals 0. Similarly, in the second from the left wire on rod 1, in Fig. 2, the orange faces of the cubes have been brought into view by selective rotation of the cubes, and the numbers on those faces of the cubes taken with the number on the frame at the head of that row indicates that 2 minus 2 equals 0.

In Fig. 3, one set of cubes is set to illustrate a problem in addition and its solution, and another set of cubes is shown in position to illustrate a problem in subtraction and its solution. Obviously, a frame having a large number of rods and cubes may be manipulated to illustrate large numbers of problems and their solutions of both addition and subtraction. The numbers upon the various different colored faces of a group of cubes upon a rod 1, have such a relationship that they solve similar problems, and, therefore, when the objects upon the rods 1 are in the form of cubes, four different problems in addition and four in subtraction may be performed between objects on any one wire or rod. By increasing the number of rods and cubes thereon in any frame, obviously, the number of problems which may be solved by any one appliance increases in multiples of eight.

Figure 8:
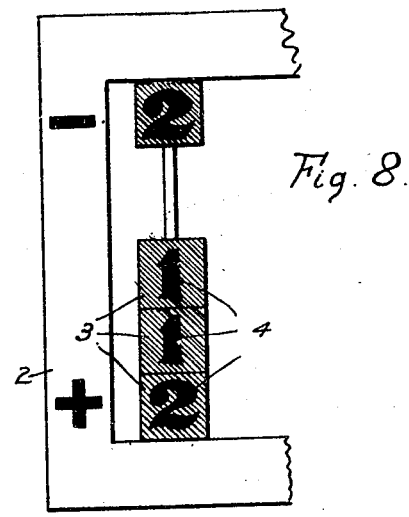
Fig. 8 is an elevation of a portion of a device somewhat similar to Figs. 1 to 3, but illustrating a modification thereof in which the problem and solution are carried entirely by the objects instead of partly on the objects and partly on the frame, as in Figs. 1 to 5.

In Fig. 8, the number of cubes or objects upon any wire or rod 1 may be increased, and the end objects will carry numbers which were formerly placed at the ends of the rod 1 upon the frame. Thus, the different faces of the end cubes on any wire or rod may have different numbers, if desired, so that the range of possible problems is considerably increased.

In Fig. 6, the appliance is arranged for instruction in reading and spelling. The cubes upon each wire or rod 1 have different colored faces and the color of each face of a cube is identical with or related to a color of a face of each other cube or object upon the same wire or rod 1. In this instance, the faces of the cubes or objects, instead of bearing numerals, may be provided with letters of the alphabet, and, if desired, pictures of various simple objects with which a child is familiar, such as eggs, tops, fans, hats, well known animals, etc. In the upper group of Fig. 6, the blue faces of the cubes have been brought into view by selective rotation of the cubes, and the alphabet letters E—G—G, and a picture of an egg appear in a row, thus illustrating an exercise in reading and spelling. The child soon learns to adjust the cubes to bring all of the faces of the same color into view, and obviously indicate words and a related picture, such as the alphabet letters E—G—G, and the picture of an egg. Recognizing the picture of the egg, the child learns very soon that those three alphabet letters arranged in that order will spell egg, and whenever those three letters appear in that order, will know that the word egg is meant. The spelling of the word egg is thus soon learned, and the appearance of these letters in this manner also teaches the child sight reading, because it soon recognizes that those three letters in that order are the word symbol of an egg.

In the second row from the top, in Fig. 6, the red faces have been brought into view and spell the word top, with the picture of a top. The child learns this exercise in spelling and sight reading in the same manner.

In the third from the top row in Fig. 6, the colors of the faces do not agree and merely illustrate how the cubes appear when they are not set for any particular exercise.

Figure 7:
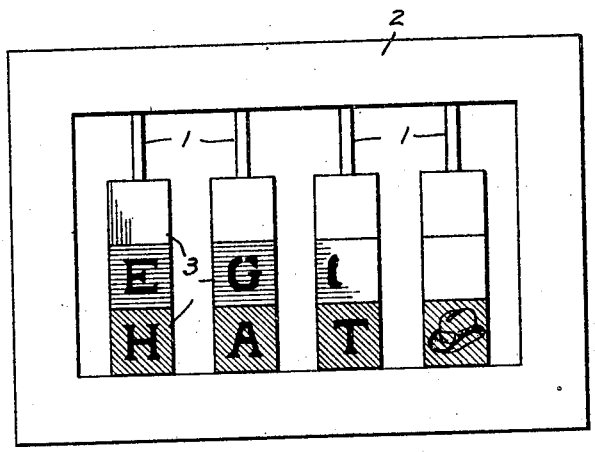
Fig. 7 is an elevation of a device also constructed in accordance with the invention, but illustrating its use in the instruction of spelling in a slightly different manner from that used in Fig. 6.
Figure 5:
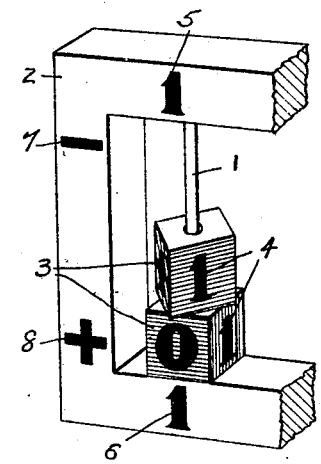
Fig. 5 is a perspective of a portion of the device, with the manner of manipulation of the same.

In Fig. 7, a similar appliance is illustrated, except that instead of having the identical faces of the cubes related and read along the rods 1 they are read crosswise. That is, each face of a cube on any wire is identical or related to the color of a face on each other cube on the next adjacent wire or rod 1, so that by rotating the cubes in any row crosswise of the rods 1 until the same or related colors appear, a problem in spelling or arithmetic is obtained. Thus, at the bottom row of Fig. 7, with the green faces in view, the word hat is spelled and the picture of a hat is illustrated.

In Figs. 1 to 8, the objects or cubes are shown of dimensions between opposite faces such that they substantially fill the space between the faces of the frame in which they are placed. That is, their thickness is approximately equal to the thickness of the frame in which they are mounted, so that when the frame is laid upon a surface upon which it is to be supported, with its face abutting the surface on which it is supported, the objects or cubes will be held against rotation until the frame is moved somewhat from that surface. Thus accidental changes or displacement of the cubes after being once adjusted will be prevented as long as the frame rests flat against a surface.

Figure 9:
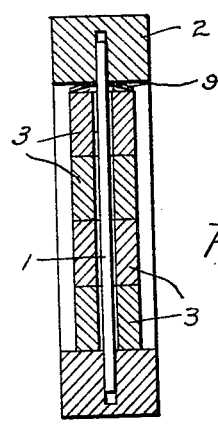
Fig. 9 is a sectional elevation of a frame, such as that of Fig. 6, and illustrating one manner of holding the objects in adjusted positions.

In cases, such as in Fig. 6, where the objects substantially fill the length of the wire or rod 1 on which they are mounted, suitable friction means may be employed for frictionally holding the cubes in adjusted positions. As an example of such an adjustment, note Fig. 9, where a spring element 9, such as a concave washer slit radially from its edges to some extent to form spring fingers, is fitted over the wire or rod 1, so as to be under compression between the frame and an end face of an adjacent object or cube 3. This washer thus frictionally resists rotation of the adjacent object or cube 3, and through it also all of the objects or cubes upon the same wire or rod 1.

Figure 10:
Fig. 10 is an elevation of a group of blocks forming a unit which may be used without a frame.

In Fig. 10, one of the rods 1 carrying a group of blocks 3 forming a unit is shown separate from a frame, thus illustrating how sets of units may be used without the frames if desired. For such units the rods 1 are provided at their ends with beads or enlargements 10 to confine the blocks to the rod 1.

While in the description I have referred to identical colors for the different faces of the objects bearing any one particular exercise, it will be understood that related colors may instead be used, if desired. For example, red, white and blue might be employed as the related colors, which, when brought together in that order will display numbers or letters indicating an exercise. Preferably identical colors for any problem are used, since a child more readily learns to group colors according to their likeness than according to a particular order of different colors.

It will be obvious that various changes in the details which have been herein described and illustrated in order to explain the nature of the invention, may be made by those skilled in the art within the principle and scope of the invention as expressed in the appended claims.

I claim as my invention:—

1. In an educational appliance, a rod, a plurality of multi-faced objects independently rotatable upon said rod upon a common central axis, the faces of said objects having characteristics by which they may be identified and distinguished and also bearing selected character representations, the characteristics of each face of an object having a selected relation to that of a face of each of the other objects, and the character representations upon those faces having the same characteristics, when brought into view by proper selective rotation of the objects, together indicating an educational exercise.

2. An educational appliance comprising a frame, a plurality of rods extending across the frame in approximately parallel relation to one another, a plurality of multi-faced objects independently rotatable centrally of themselves upon said rods in separate, non-overlapping paths, the faces of said objects having characteristics by which they may be identified and distinguished and also bearing selected character representations, the representations upon faces of adjacent objects having particularly related characteristics when brought into view by selective rotation of the objects, together indicating an educational exercise.

3. An educational appliance comprising a frame, a rod mounted on said frame, a plurality of multi-faced objects independently rotatable on said rod, the faces of said objects having characteristics by which they may be identified and distinguished, and also bearing selected character representations, said frame also bearing a character adjacent said rod, the representations upon faces of the objects having particularly related characteristics, when brought into view by selective rotation of the objects indicating together with the character upon the frame, an educational exercise, the exercises differing with the different groups of related faces of the objects which are brought into view.

4. An educational appliance, comprising a frame, a rod mounted on said frame, a plurality of multi-faced objects rotatably and slidably mounted on said rod, so as to be shiftable into groups at either end of the rod, the faces of said objects having characteristics by which they may be identified and distinguished from others, and also bearing selected character representations, said frame also bearing characters adjacent the rod ends, the representations upon faces of the objects bearing particularly related characteristics, when brought into view by selective rotation of the objects, indicating with the character upon the frame at the end of the rod where the objects are shifted, an educational exercise.

5. An educational device comprising a frame, a plurality of rods mounted in said frame between its faces, a plurality of objects mounted for independent rotation on said rods, each object having an even number of faces with a distance between opposite faces approximately equal to the thickness of the frame between its faces, whereby when the frame is placed with one of its faces against a surface, rotation of the objects will be prevented by their engagement with said surface, said faces of the objects having characters thereon which will cooperate with related faces of adjacent objects when adjacent objects in a desired direction are rotated to bring related faces into view at any time to indicate at least part of an educational exercise.

6. An educational device comprising a frame, a plurality of rods mounted in said frame, a plurality of multi-faced objects independently rotatable and slidable upon each rod, the faces of the objects having related characteristics by which they may be identified and distinguished, and also bearing selected numerals, the frame adjacent both ends of the rods also bearing numerals, the numerals upon faces of adjacent objects upon each rod, when those faces having particularly related characteristics are brought into view by selective rotation of the objects, indicating with the numerals upon the frame certain mathematical exercises, the particular exercise indicated being dependent upon which end of the rod the objects are grouped.

7. An educational device comprising a frame, a plurality of rods mounted in said frame, a plurality of multi-faced objects independently rotatable upon each rod, the faces of the objects having related characteristics by which they may be identified and distinguished, and also bearing selected numerals, the frame adjacent both ends of the rods also bearing numerals, the numerals upon faces of adjacent objects upon each rod, when those faces having particularly related characteristics are brought into view by selective rotation of the objects, indicating when considered with the adjacent numeral on the frame at one end of the rod on which these objects are mounted one arithmetical exercise, and when considered with the adjacent number on the frame at the other end of that rod, another and different arithmetical exercise.

8. An educational device comprising a frame, a plurality of rods mounted in said frame, a plurality of multi-faced objects rotatable upon each rod independently of one another, the faces of the objects having related characteristics by which they may be identified and distinguished, and also bearing selected numerals, said frame also having selected numerals arranged at the ends of rows of said objects and related to the numerals on said objects in each row, whereby when said objects in any row are rotated to bring into view at one time the faces having related identifying characteristics, the numbers on the objects so brought into view will indicate in conjunction with the numeral on the frame at one end of that row an arithmetical exercise.

9. An educational device comprising a frame, a rod carried by said frame, a plurality of multi-faced objects rotatable on said rod independently of one another and upon a common central axis, the faces of each object having identification characteristics related to those of the other objects, whereby the objects may be rotated to present only faces with related characteristics at one time on all the objects, the faces with related characteristics also bearing characters which together indicate an educational exercise.

10. An educational device comprising a frame, a rod carried by said frame, a plurality of multi-faced objects rotatable on said rod independently of one another, the faces of each object having identification characteristics related to those of the other objects, whereby the objects may be rotated to present only faces with related characteristics at one time on all the objects, said frame bearing a key character adjacent the end of said rod, the faces with related characteristics also bearing characters which together with said character on said frame indicate an educational exercise.

11. An educational problem comprising a frame, a rod carried by said frame, a plurality of multifaced objects rotatable on said rod independently of one another, the faces of each object having identification characteristics related to those of the other objects whereby the objects may be selectively rotated to present only faces having related characteristics at one time, said frame having characters adjacent both ends of said rod and said faces having characters, the characters on said faces with related characteristics, when considered with the character on the frame adjacent one end thereof, indicating one educational exercise, and, when considered with the character on the frame adjacent the other end thereof, indicating another and different educational exercise.

12. An educational problem comprising a frame, a rod carried by said frame, a plurality of multi-faced objects rotatable and slidable on each rod independently of one another, the faces of each object having identification characteristics related to those of the other objects, whereby the objects may be selectively rotated to present only faces having related characteristics at one time, said frame having characters adjacent both ends of said rod and said faces having characters, the characters on said faces with related characteristics, when considered with the character on the frame adjacent one end thereof, indicating one educational exercise, and, when considered with the character on the frame adjacent the other end thereof, indicating another and different educational exercise, said rod having a length greater than occupied by the objects whereby the objects may be slid to one end or the other to be away from and prevent confusion with the character at either end thereof which is not being considered.

NELLIE YORK TROIDL